United States Patent
Pilz et al.

(10) Patent No.: US 10,174,389 B2
(45) Date of Patent: Jan. 8, 2019

(54) METHOD FOR TREATING DESULFURIZATION SLAG

(71) Applicant: voestalpine Stahl GmbH, Linz (AT)

(72) Inventors: Karl Pilz, Tragwein (AT); Bertram Fritz, Ansfelden (AT); Jürgen Antrekowitsch, Leoben (AT); Gerald Schneeberger, Bruck a.d. Mur (AT)

(73) Assignee: voestalpine Stahl GmbH, Linz (AT)

( * ) Notice: Subject to any disclaimer, the term of this patent is extended or adjusted under 35 U.S.C. 154(b) by 236 days.

(21) Appl. No.: 15/038,514

(22) PCT Filed: Nov. 27, 2014

(86) PCT No.: PCT/EP2014/075771
§ 371 (c)(1),
(2) Date: May 23, 2016

(87) PCT Pub. No.: WO2015/078951
PCT Pub. Date: Jun. 4, 2015

(65) Prior Publication Data
US 2016/0289783 A1    Oct. 6, 2016

(30) Foreign Application Priority Data

Nov. 28, 2013 (DE) .......... 10 2013 113 197

(51) Int. Cl.
*C04B 5/00* (2006.01)
*C21B 3/06* (2006.01)
*C22B 7/04* (2006.01)

(52) U.S. Cl.
CPC .................. *C21B 3/06* (2013.01); *C04B 5/00* (2013.01); *C22B 7/04* (2013.01); *C21B 2100/04* (2013.01);
(Continued)

(58) Field of Classification Search
CPC ......... C21B 3/06; C21B 2200/00; C22B 7/04; C04B 5/00; Y02W 30/543
See application file for complete search history.

(56) References Cited

U.S. PATENT DOCUMENTS 4,068,472 A * 1/1978 Takata ...................... F01N 3/22
 60/276
4,273,312 A   6/1981 Phillips, Jr. et al.
(Continued)

FOREIGN PATENT DOCUMENTS

AT           406689 B      7/2000
CN       101337684 A  *   1/2009
(Continued)

OTHER PUBLICATIONS

JP 2013185209. Machine translation (Year: 2013).*
(Continued)

*Primary Examiner* — George Wyszomierski
*Assistant Examiner* — Tima M McGuthry-Banks
(74) *Attorney, Agent, or Firm* — Rankin, Hill & Clark LLP

(57) ABSTRACT

A method for treating desulfurization slag involves conveying desulfurization slag from pig iron desulfurization to a unit where the desulfurization slag is melted at a temperature of at least 1,400° C. In the unit, a thorough mixing is achieved. The treatment takes place in the unit under oxidizing conditions. Sulfur dioxide is generated and collected from the roasting gas and supplied for further utilization.

20 Claims, 3 Drawing Sheets

Figure 1:
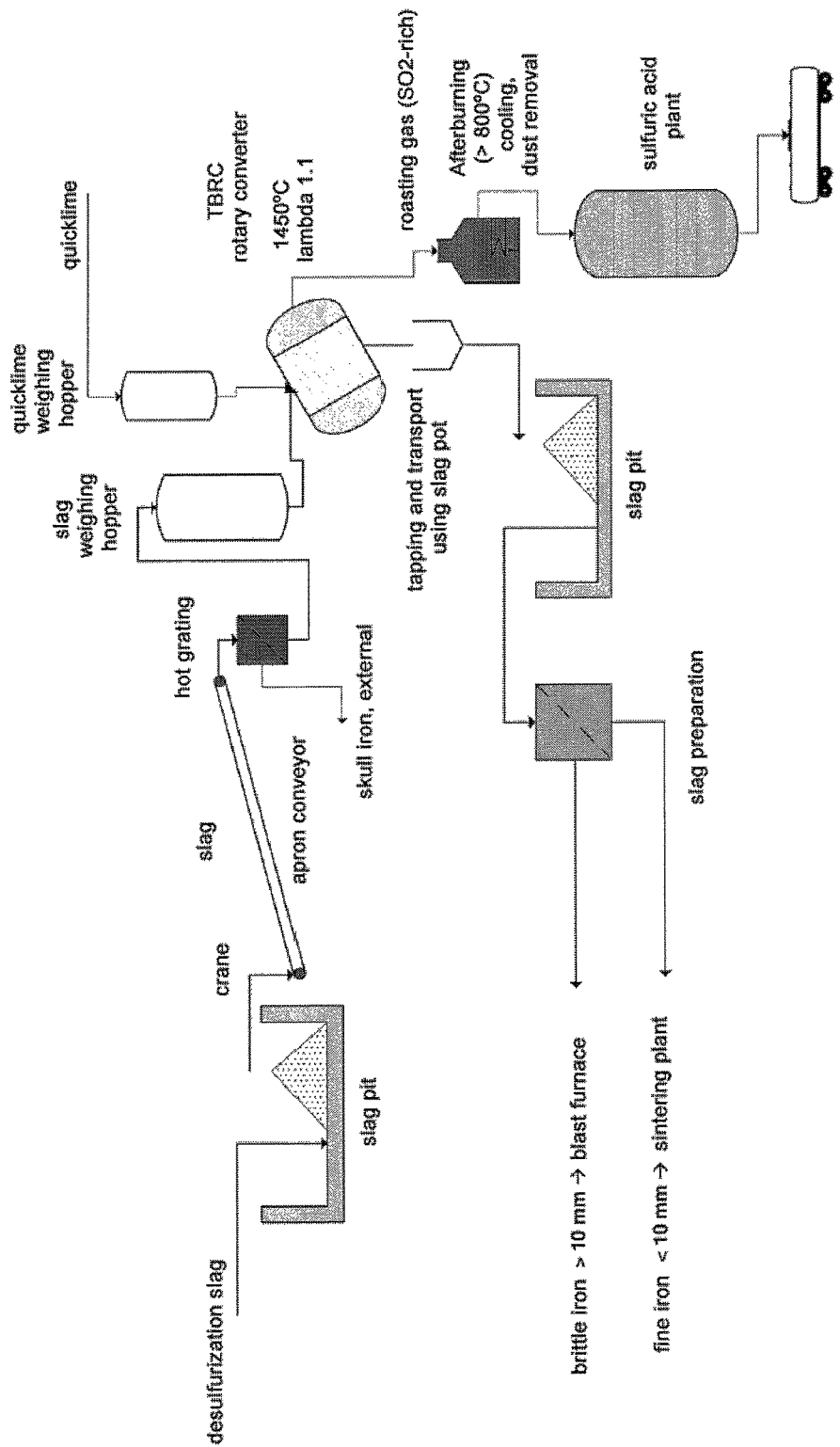

(52) U.S. Cl.
CPC ........ *C21B 2100/42* (2017.05); *Y02W 30/543* (2015.05)

(56) References Cited

U.S. PATENT DOCUMENTS

| | | | | |
|---|---|---|---|---|
| 5,180,423 A | * | 1/1993 | Marcuson | C21C 5/35 266/173 |
| 5,466,275 A | | 11/1995 | More | |
| 6,060,015 A | * | 5/2000 | K.ang.gstrom | C21C 5/42 266/246 |

FOREIGN PATENT DOCUMENTS

| | | | |
|---|---|---|---|
| DE | 19913645 A1 | | 11/1999 |
| DE | 102011079325 A1 | | 1/2013 |
| FR | 1066261 | | 6/1954 |
| FR | 2297914 | | 8/1976 |
| GB | 1258235 | | 12/1971 |
| JP | 07010616 A | * | 1/1995 |
| JP | 2006169089 A | * | 6/2006 |
| JP | 2013-087290 A | | 5/2013 |
| JP | 2013-189688 A | | 9/2013 |
| JP | 2013185209 A | * | 9/2013 |
| WO | WO 0075385 A1 | * | 12/2000 |

OTHER PUBLICATIONS

CN 101337684 A. Machine translation (Year: 2009).*
JP 200169089. Machine translation (Year: 2006).*
JP 07010616. Machine translation (Year: 1995).*
ZA 200109971 patent family document for WO 0075385 (Year: 2000).*
Machine translation for AT406689 published Jul. 25, 2000, eight pages.
Machine translation for DE102011079325 published Jan. 24, 2013, 29 pages.
Machine translation for DE19913645 published Nov. 25, 1999, nine pages.
Machine translation for FR1066261 published Jun. 3, 1954, five pages.
Machine translation for FR2297914 published Aug. 13, 1976, 11 pages.
Machine translation for JP2013087290 published May 13, 2013, 16 pages.
Machine translation for JP2013189688 published Sep. 26, 2013, 15 pages.
International Search Report for corresponding PCT/EP2014/075771 dated Apr. 8, 2015, three pages.

* cited by examiner

METHOD FOR TREATING DESULFURIZATION SLAG

The invention relates to a method for treating desulfurization slag.

Pig iron of the kind obtained in a blast furnace usually contains 0.03% to 0.2% sulfur. This sulfur content is undesirable and before further processing, is sharply reduced through different desulfurization methods, depending on the intended use of the steel to be produced from the pig iron. This pig iron desulfurization causes large quantities of sulfur-containing slag to accumulate, which contains a considerable amount of iron because of the mixing with pig iron during the deslagging process. The accumulation of used, iron-containing desulfurization slag from the pig iron desulfurization of a large blast furnace with a daily production of 10,000 tons of pig iron amounts to approximately 300 tons per day. The recovery of iron from the slag in this connection is labor-intensive and relatively costly. Since large quantities of sulfur-containing slag cannot be easily dumped, a wet chemical treatment method is known, for example from DE 38 37 249 A1. In this connection, it is disadvantageous that such methods are very costly.

EP 0 627 012 B1 has disclosed a process for desulfurizing iron melts, in which in a tiltable low-shaft furnace or a correspondingly adapted electrical furnace or ladle furnace, the desulfurization slag and impurities, which depend on the raw materials used, are brought to a temperature of between 1400° C. and 1800° C. through resistance heating of the slag using electrodes immersed in the slag and the sulfur-containing molten iron is desulfurized with this molten slag and either batchwise or continuously, is poured off below the desulfurizing slag, wherein the ratio of molten iron to slag should not exceed the value of 10:1 and the desulfurizing slag is regenerated continuously and/or batchwise. In this case, [the removal of] the sulfur from the desulfurization slag should take place by means of air, oxygen, water or steam, iron oxide, iron or, or manganese ore.

AT 406 689 B has disclosed a method for regenerating desulfurizing slag in which molten pig iron and molten desulfurizing slag are brought into contact in a treatment vessel and the molten pig iron is desulfurized and most of the desulfurized molten pig iron is poured off from the treatment vessel; all of the desulfurizing slag in the treatment vessel remains molten, the molten desulfurizing slag is regenerated through treatment with gaseous oxidizing agents, and the resulting $SO_2$ is removed from the desulfurizing slag and by means of a bell, the $SO_2$-containing exhaust gas can be inexpensively removed while avoiding damage to the environment.

In the preparation of desulfurizing slag, three fractions are produced: coarse slag, so-called brittle iron 10 mm to 250 mm in size, and fine iron 0 mm to 10 mm in size. The coarse iron is sold to electro-steel plants, the brittle iron is returned to the blast furnace, and part of the fine iron is conveyed to the iron ore sintering plant.

This conventional procedure in steel plants, however, conveys a large part of the sulfur back into the process, which should actually be avoided. In particular, the reuse of the slag causes quite significant quantities of sulfur to be conveyed back into the pig iron production. The disadvantage in this connection is that in the entire cycle of the process, there is no sink for selectively discharging the sulfur.

Collectively throughout Europe, partial quantities of desulfurization slags are utilized in sintering plants or for example used for land-filling purposes or noise protection barriers, but a high percentage are still dumped, as explained, for example, in the IRC Reference Report Best Available Techniques (BAT) Reference Document for Iron and Steel Production published in March 2012.

The object of the invention is to create a method for treating desulfurization slag, which avoids dumping problems, performs the desulfurization in a way that is economical on the whole and does not cause any circulation of sulfur in pig iron production.

According to the invention, it has turned out that a reuse of the slag in the pig iron process because of its high iron content nevertheless only makes sense economically and from a process engineering standpoint if the sulfur can be removed from the slag as much as possible. To this end, the powerful bonding of the sulfur to the slag has to be broken down, mainly as calcium sulfide. According to the invention, this only succeeds in a relatively narrow processing window, because only within this processing window can the sulfur, which is very strongly bonded into the slag, be almost completely released again in gaseous form. The known roasting processes are not suitable in this case because of the high processing temperature required in the method according to the invention.

In this connection, it is advantageous that on the one hand, the slag can be meaningfully reused in the blast furnace process in order to make use of its considerable iron content and on the other hand, the sulfur can be reliably expelled from the slag so that the roasting gas produced can be used for producing sulfuric acid, which is also of very great technical importance and for which there is a corresponding demand.

Figure 2:
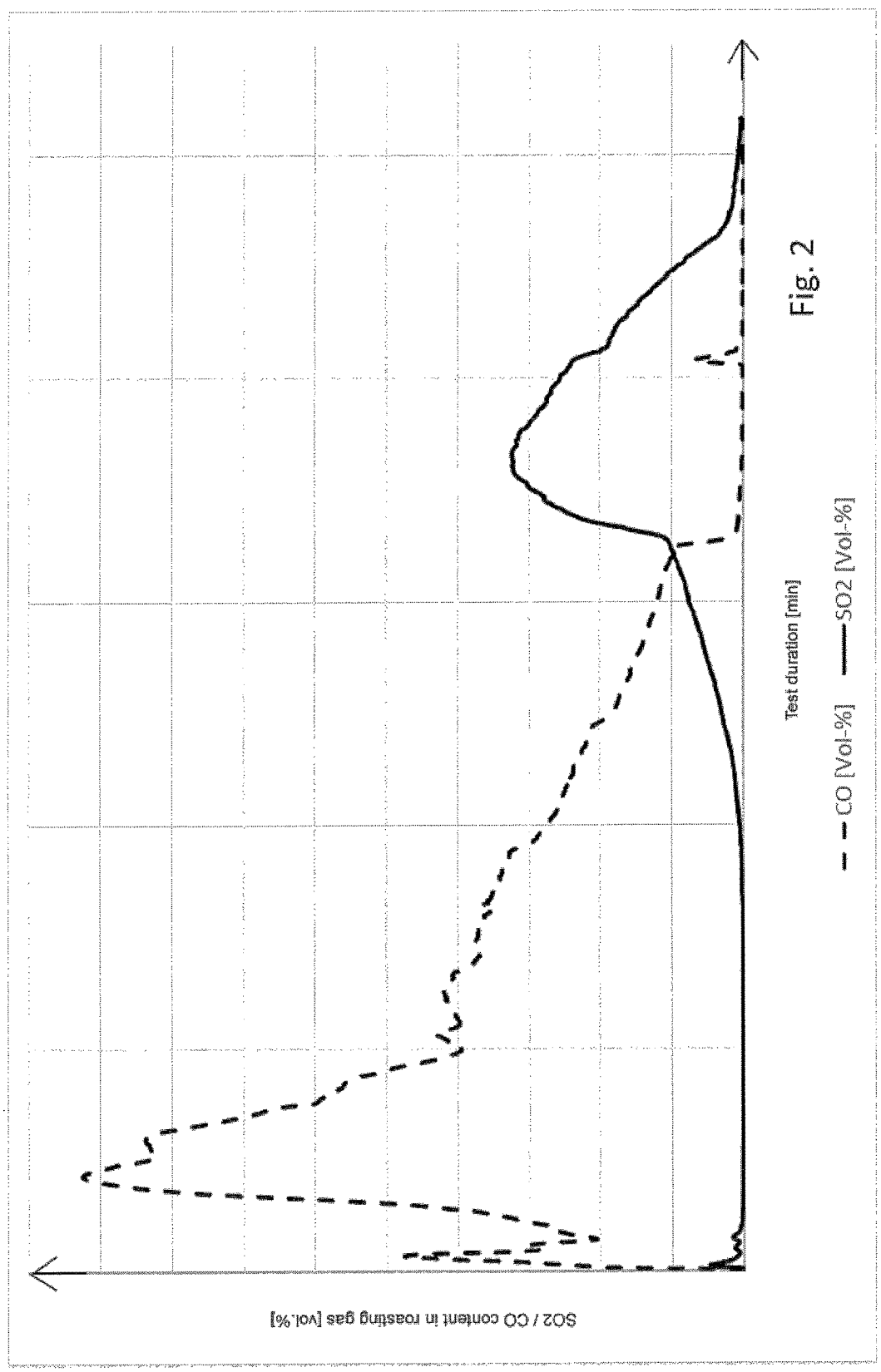
Figure 3:
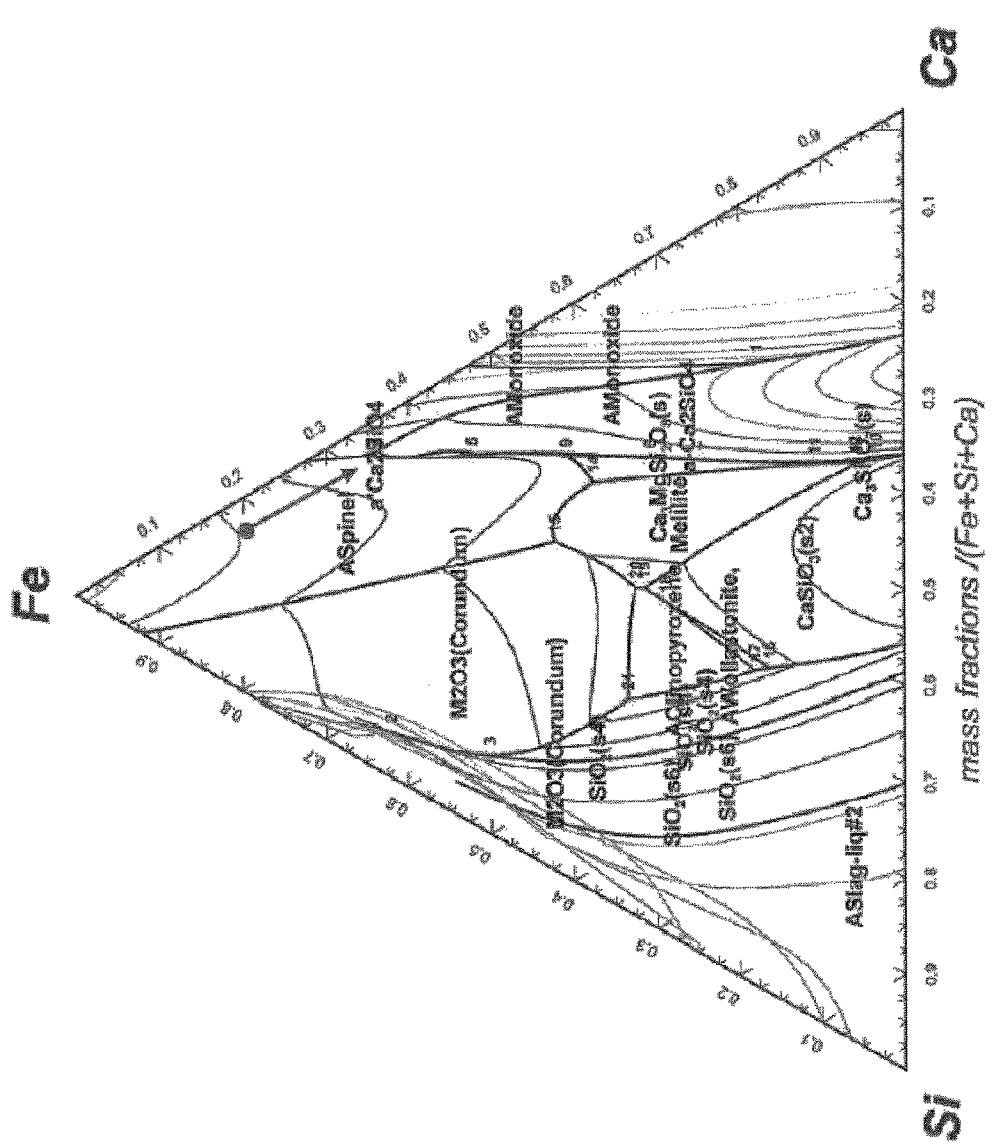

The invention will be explained by way of example in conjunction with the drawings. In the drawings:

FIG. 1: shows the process sequence;

FIG. 2: shows the relationship between the release of CO and $SO_2$;

FIG. 3: shows the effect of admixing quicklime on the melting point of the slag.

According to the invention, the desulfurization slag is heated to temperatures greater than 1,400° C. At lower desulfurization temperatures, the material handling is made significantly more difficult due to agglomeration. According to the invention, the process is carried out in a unit that permits a sufficient turbulence and thus thorough mixing, particularly in a so-called rotary converter (TBRC top blown rotary converter) or a short rotary furnace. In this case, a slightly oxidizing atmosphere is used and the sulfur is released in the form of $SO_2$ roasting gas. In order to be able to operate the burner of the rotary converter independent of the oxygen demand of the roasting process, the reaction oxygen can be supplied by means of a separate lance.

The slag is processed until no more $SO_2$ roasting gas is released; the rotary converter ensuring a good homogenization. The $\lambda$ value of the burner during the melting of the slag is set to 1.3-1.6, preferably 1.4-1.5. The excess oxygen is necessary in order to quickly convert the carbon contained in the pig iron fraction of the slag to CO and $CO_2$. Otherwise, the pig iron, which is low-melting due to the presence of the carbon (melting point of approx. 1,200° C. according to the iron/carbon diagram), rapidly precipitates out as regulus of iron and constitutes a separate phase. For the actual roasting (sulfur bonded into the slag released as $SO_2$), the $\lambda$ value of the burner is preferably set to >2.0 in order to ensure a sufficient quantity of excess oxygen.

The optimum $\lambda$ value of the process can be set based on the exhaust gas components CO and $SO_2$ and the percentages of them in the exhaust gas. In addition, the change-over point can be determined by the decrease of the CO concentration and the increase in the $SO_2$ concentration and correspondingly, the $\lambda$ value can also be changed over.

A standard exhaust gas measurement can advantageously be used for regulating the process and exhaust gas analysis can be used to optimize the regulation.

In this connection, the unit used according to the invention permits an optimum, simple charging in which, when necessary, the thorough mixing of the molten slag can be improved in that the turbulence is increased through more powerful rotary motion.

In a preferred embodiment, the slag is supplied to the unit not in the cold state, but with the highest possible residual heat in order to accelerate the release of the gases.

It is also possible, particularly when using a TBRC, to process relatively small charges; both the excess air and the supply of heat can be optimally adjusted by means of the oxygen/natural gas burner.

In order to keep the slag molten and to ensure a molten tapping, up to 20% quicklime can be added to the unit or more precisely stated, to the slag in the unit. The admixture required can be taken from FIG. 3; this depends on the composition of the slag. The CO-containing exhaust gas undergoes afterburning; then the exhaust gas, which contains a high level of $SO_2$, is conveyed in a known way to sulfuric acid production.

In an exemplary embodiment according to the invention, desulfurization slag travels via corresponding transport devices 1 into a slag pit 2 in which the desulfurization slag is stored in a hot state. By means of a corresponding crane system (not shown), the slag is also always presorted by means of an apron conveyor 3 via a hot grating. From the hot grating 4, the slag travels into a weighing hopper 5 and from the weighing hopper 5, travels into the rotary converter 6. By means of another weighing hopper 7, which contains quicklime, the rotary converter can be correspondingly charged with quicklime. In the rotary converter, the slag is treated with the quicklime at more than 1,400° C., in particular 1,450° C., for 0.5 to 2 hours, depending on the time at which the release of $SO_2$ roasting gas is complete. The $\lambda$ value of the burner in the melting of the slag is preferably set to 1.4-1.5. The excess oxygen is necessary in order to quickly convert the carbon contained in the pig iron fraction of the slag to CO and $CO_2$. Otherwise, the pig iron, which is low-melting due to the presence of the carbon, (melting point of approx. 1,200° C. according to the iron/carbon diagram), rapidly precipitates out as regulus of iron and constitutes a separate phase. For the actual roasting (sulfur bonded into the slag released as $SO_2$), the $\lambda$ value of the burner is preferably set to >2.0 in order to ensure a sufficient quantity of excess oxygen. Then the tapping takes place in which the tapped slag is conveyed by means of a slag pot 8 to another slag pit 9, and from the slag pit 9, travels into a slag preparation area 10 in which the slag is divided into the fraction >10 mm in size (brittle iron) and a fraction <10 mm in size (fine iron). In this case, the brittle iron is used for further processing in the blast furnace, while the fine iron is conveyed to the sintering plant.

The roasting gas is conveyed from the rotary converter into an afterburning unit 11, undergoes afterburning in this afterburning unit, then is preferably cooled to approximately 400° C. to 500° C., undergoes dust removal, and is then conveyed to the sulfuric acid plant 12.

In the method according to the invention, it is advantageous that the desulfurization slag is desulfurized and this sulfur is conveyed to a utilization where it is used in the form of sulfuric acid. It is thus possible to remove sulfur from pig iron production.

A slag treated according to the invention has an assured sulfur content of less than 0.1% by mass, most often even of 0.01% by mass, relative to the weight of the slag and therefore when conveyed back into pig iron production, supplies a sulfur load that is negligible.

In addition, this method is primarily advantageous for an integrated ironworks, since in addition to the desulfurization, the iron is fully utilized internally and can be supplied directly to the pig iron production.

In addition, it is possible to avoid dumping and interim storage, which are very costly, one aspect of which is a significant reduction of the sulfur input into the pig iron production. A sulfur sink in the internal circulation is achieved through the production of sulfuric acid. The sulfuric acid produced in this case is a valuable byproduct.

The invention claimed is:

1. A method for treating desulfurization slag, comprising:
   (a) providing desulfurization slag comprising sulfur, from pig iron desulfurization,
   (b) conveying said desulfurization slag to a unit including a burner, said unit assuring a thorough mixing,
   (c) melting the desulfurization slag at a temperature of at least 1,400° C., wherein a $\lambda$ value of the burner is set to 1.3-1.6 during said melting,
   (d) setting the burner to a $\lambda$ value greater than 2.0 to generate a roasting gas including $SO_2$,
   (e) collecting the generated $SO_2$, and
   (f) supplying said generated $SO_2$ for further utilization.

2. The method of claim 1, further comprising adding quicklime to the desulfurization slag in the unit.

3. The method of claim 1, further comprising tapping of a treated desulfurization slag and feeding the treated desulfurization slag into pig iron production.

4. The method of claim 3, wherein the treated desulfurization slag has a sulfur content of less than 0.1% by mass.

5. The method of claim 3, wherein the treated desulfurization slag has a sulfur content of less than 0.01% by mass.

6. The method of claim 1, wherein the unit is a top blown rotary converter.

7. The method of claim 1, wherein the $\lambda$ value of the burner during melting is set to 1.4-1.5.

8. The method of claim 7, further comprising adding quicklime to the desulfurization slag in the unit.

9. The method of claim 7, further comprising tapping of a treated desulfurization slag and feeding the treated desulfurization slag into pig iron production.

10. The method of claim 7, wherein a treated desulfurization slag has a sulfur content of less than 0.1% by mass.

11. The method of claim 7, wherein a treated desulfurization slag has a sulfur content of less than 0.01% by mass.

12. The method according to claim 1, wherein the unit is a top blown rotary converter.

13. A method for treating desulfurization slag, comprising:
   (a) providing desulfurization slag comprising sulfur, from pig iron desulfurization,
   (b) conveying said desulfurization slag to a unit including a burner, said unit assuring a thorough mixing,
   (c) melting the desulfurization slag at a temperature of at least 1,400° C., wherein a $\lambda$ value of the burner is set to 1.3-1.6 during said melting,
   (d) setting the burner to a $\lambda$ value greater than 2.0 to generate a roasting gas including $SO_2$, CO and dust,
   (e) afterburning at a temperature of at least 800° C., (f) cooling the roasting gas, (g) collecting the generated $SO_2$, (h) removing the dust, and (i) supplying said generated $SO_2$ for further utilization.

14. The method of claim 13, further comprising adding quicklime to the desulfurization slag in the unit.

15. The method of claim 13, further comprising tapping of a treated desulfurization slag and feeding the treated desulfurization slag into pig iron production.

16. The method of claim 13, wherein a treated desulfurization slag has a sulfur content of less than 0.1% by mass.

17. The method of claim 13, wherein a treated desulfurization slag has a sulfur content of less than 0.01% by mass.

18. The method according to claim 13, wherein the unit is a top blown rotary converter.

19. The method according to claim 13, further comprising:
  (a) determining a volume percent of exhaust gas components CO and $SO_2$ in an exhaust gas during the melting of the slag and during generating the roasting gas,
  (b) when the volume ratio of $SO_2$ to CO exceeds unity, setting the burner $\lambda$ value to greater than 2.

20. The method of claim 19, further comprising adding quicklime to the desulfurization slag in the unit.

* * * * *